US007864096B2

(12) United States Patent
Stayton et al.

(10) Patent No.: US 7,864,096 B2
(45) Date of Patent: Jan. 4, 2011

(54) SYSTEMS AND METHODS FOR MULTI-SENSOR COLLISION AVOIDANCE

(75) Inventors: Gregory T. Stayton, Peoria, AZ (US); Mark D. Smith, Glendale, AZ (US); Michael F. Tremose, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 307 days.

(21) Appl. No.: 12/011,200

(22) Filed: Jan. 23, 2008

(65) Prior Publication Data

US 2009/0184862 A1 Jul. 23, 2009

(51) Int. Cl.
*G01S 13/00* (2006.01)

(52) U.S. Cl. ............................ 342/29; 342/30; 342/52; 342/53; 342/61; 342/63; 342/94

(58) Field of Classification Search ............ 342/29–32, 342/52–54, 61, 63, 89, 90, 94–97
See application file for complete search history.

(56) References Cited

U.S. PATENT DOCUMENTS

| | | | | |
|---|---|---|---|---|
| 3,801,979 | A * | 4/1974 | Chisholm | 342/31 |
| 4,139,848 | A * | 2/1979 | Maxwell, Jr. | 342/30 |
| 4,910,526 | A * | 3/1990 | Donnangelo et al. | 342/455 |
| 5,075,694 | A * | 12/1991 | Donnangelo et al. | 342/455 |
| 5,382,954 | A * | 1/1995 | Kennedy et al. | 340/961 |
| 5,581,250 | A * | 12/1996 | Khvilivitzky | 340/961 |
| 5,710,648 | A * | 1/1998 | Frigo | 398/108 |
| 6,208,284 | B1 * | 3/2001 | Woodell et al. | 342/30 |
| 6,252,525 | B1 * | 6/2001 | Philiben | 340/961 |
| 6,720,920 | B2 | 4/2004 | Breed et al. | |
| 6,771,208 | B2 * | 8/2004 | Lutter et al. | 342/52 |
| 6,795,772 | B2 * | 9/2004 | Lin et al. | 701/301 |
| 6,804,607 | B1 * | 10/2004 | Wood | 701/301 |
| 6,903,677 | B2 * | 6/2005 | Takashima et al. | 342/70 |

(Continued)

FOREIGN PATENT DOCUMENTS

GB 2450987 A 1/2009

OTHER PUBLICATIONS

Obstacle awareness and collision avoidance radar sensor system for low-altitude flying smart UAV Kwag, Y.K.; Kang, J.W.; Digital Avionics Systems Conference, 2004. DASC 04. The 23rd vol. 2 Publication Year: 2004, pp. 12.D.2-121-10 vol. 2.*

(Continued)

*Primary Examiner*—Thomas H Tarcza
*Assistant Examiner*—Peter Bythrow
(74) *Attorney, Agent, or Firm*—Allen J. Moss; Alex Starkovich; Squire, Sanders & Demspey L.L.P.

(57) ABSTRACT

An embodiment of the present invention provides a collision avoidance system for a host aircraft comprising a plurality of sensors for providing data about other aircraft that may be employed to determine one or more parameters to calculate future positions of the other aircraft, a processor to determine whether any combinations of the calculated future positions of the other aircraft are correlated or uncorrelated, and a collision avoidance module that uses the correlated or uncorrelated calculated future positions to provide a signal instructing the performance of a collision avoidance maneuver when a collision threat exists between the host aircraft and at least one of the other aircraft.

14 Claims, 13 Drawing Sheets

TCAS AND OPTICAL SENSOR TRACKING COORDINATE CONVERSION AND CORRELATION

U.S. PATENT DOCUMENTS

| | | | | |
|---|---|---|---|---|
| 6,911,936 | B2 * | 6/2005 | Stayton et al. | 342/182 |
| 7,006,032 | B2 * | 2/2006 | King et al. | 342/29 |
| 7,049,998 | B1 * | 5/2006 | Frady et al. | 342/52 |
| 7,492,307 | B2 * | 2/2009 | Coulmeau | 342/32 |
| 7,737,878 | B2 * | 6/2010 | van Tooren et al. | 342/29 |
| 7,747,360 | B2 * | 6/2010 | Canu-Chiesa et al. | 701/3 |
| 2002/0133294 | A1 * | 9/2002 | Farmakis et al. | 701/301 |
| 2003/0137444 | A1 * | 7/2003 | Stone et al. | 342/30 |
| 2004/0174295 | A1 * | 9/2004 | Stayton et al. | 342/182 |

OTHER PUBLICATIONS

Radar-assisted collision avoidance/guidance strategy for planar flight Ajith Kumar, B.; Ghose, D.; Aerospace and Electronic Systems, IEEE Transactions on vol. 37 , Issue: 1,2001 , pp. 77-90.*

Implementation of collision avoidance system using TCAS II to UAVs Hyeon-Cheol Lee; Aerospace and Electronic Systems Magazine, IEEE vol. 21 , Issue: 7, 2006 , pp. 8-13.*

Remotely piloted vehicles in civil airspace: requirements and analysis methods for the traffic alert and collision avoidance system (TCAS) and see-and-avoid systems, Drumm, A.C.; Andrews, J.W.; Hall, T.D.; Heinz, V.M.; Kuchar, J.K.; Thompson, S.D.; Welch, J.D.; Digital Avionics Systems Conference, 2004. pp. 12.D.1-121-14.*

Shakernia et al., "Sense and Avoid (SAA) Flight Test and Lessons Learned," Proceedings of the AIAA Infotech@Aerospace Conference, May 2007, pp. 1-15.*

Doyle et al., Multi-Sensor Data Fusion for Helicopter Guidance Using Neuro-Fuzzy Estimation Algorithms, IEEE vol. 2, pp. 1392-1397, Oct. 22, 2005.

Borghys et al.I; "Multi-Level Data Fusion for the Detection of Targets using multi-spectral Image Sequences"; Optical Engineering; pp. 1-14; 37(2), 1998.

Kuttikkad et al.; "Registration and Exploitation of Multi-pass Airborne Synthetic Aperture Radar Images"; University of Maryland, Computer Vision Laboratory, Center for Automation Research, Apr. 1997; College Park, MD, USA.

Lacher et al.; "Unmanned Aircraft Collision Avoidance-Technology Assessment and Evaluation Methods"; pp. 1-10; The MITRE Corporation; McLean, VA, USA.

La Scala et al.; "Multi-region Viterbi Data Association Tracking for Over-the-Horizon Radar"; Cooperative Research Centre for Sensor Signal and Information Processing; Oct. 199; pp. 1-25; CSSIP, University of Melbourne; Mawson Lakes, Australia.

Okello et al.; "Tracker: A Sensor Fusion Simulator for Generalised Tracking"; Cooperative Research Centre for Sensor Signal and Information Processing; pp. 1-6; CCSSIP; Mawson Lakes, Australia.

Verlinde et al.; "Data Fusion for Long Range Target Acquisition"; In 7th Symposium on Multi-Sensor Systems and Data Fusion for Telecommunications, Remote Sensing and Radar, Lisbon, 1997, NATO.

Verlinde et al.; "Decision Fusion Using a Multi-Linear Classifier"; In proceedings of the International Conference on Multisource-Information Fusion, vol. 1, pp. 47-53; Las Vegas, NV, USA, Jul. 1998.

Verlinde et al.: "A Multi-Level Data Fusion Approach for Gradually Upgrading the Performances of Identity Verification Systems"; In B. Dasarathy, editior, Sensor Fusion: Architectures, Algorithms and Applications III, vol. 3719, Orlando FL, USA; Apr. 1999.

Zeitlin et al.; "Collision Avoidance for Unmanned Aircraft: Proving the Safety Case"; Paper#MP060219; Oct. 2006; The MITRE Corporation Center for Advanced Aviation Systems Development, McLean, VA, USA and MIT Lincoln Laboratory, MIT, Lexinton, MA, USA.

* cited by examiner

SYSTEMS AND METHODS FOR MULTI-SENSOR COLLISION AVOIDANCE

DESCRIPTION OF THE INVENTION

1. Field of the Invention

The present invention relates to collision avoidance systems and, more particularly, to collision avoidance systems and methods that employ multiple sensors to provide collision avoidance.

2. Background of the Invention

A Traffic Alert and Collision Avoidance System ("TCAS") is a computerized avionics system that is designed to reduce the danger of mid-air collisions between aircraft. TCAS is an implementation of the Airborne Collision Avoidance System mandated by the International Civil Aviation Organization to be fitted on all aircraft over 5700 kg or authorized to carry more than 19 passengers. TCAS tracking is typically accomplished by separately tracking each of the parameters of range, altitude, and bearing for each aircraft that has a transponder capable of responding to TCAS track interrogations. TCAS monitors the airspace around an aircraft, independent of air traffic control, and warns pilots of the presence of other aircraft which may present a threat of mid air collision. In certain situations, a TCAS provides a pilot with a Resolution Advisory ("RA") that suggests a flight maneuver for the pilot to execute to avoid a collision.

TCAS tracking, however, is not error-proof, and as such, pilots may perform a visual inspection to confirm the accuracy of an RA. Visual confirmation too, is prone to error. Furthermore, in the case of an unmanned aerial vehicle ("UAV"), no human pilot is present to perform a visual inspection to confirm the accuracy of any recommended maneuver, assuming such a collision avoidance maneuver was recommended for a UAV. As such, UAVs may not currently fly in commercial airspace.

SUMMARY OF THE INVENTION

In view of the foregoing, embodiments of the present invention provide collision avoidance systems and methods that employ multiple sensors to provide collision avoidance advisories.

Systems and methods consistent with embodiments of the present invention may provide means to use TCAS tracking data and optical tracking data to provide an automated advisory, such as an RA. The TCAS tracking data may be determined to be correlated or uncorrelated to the optical tracking data in order to determine what type of advisory to provide, if any. TCAS tracking data and optical tracking data are considered to be "correlated" when it is determined that they are both tracking the same object (e.g., another aircraft) and are considered to be "uncorrelated" when it is determined that they are not both tracking the same object.

Systems and methods consistent with embodiments of the present invention are not limited to employing TCAS tracking data and optional tracking data. More generally, systems and methods consistent with embodiments of the present invention may employ tracking data from any two or more sensors, attempt to correlate the tracking data, and based on such correlation of failure to correlate, determine what type of advisory to provide, if any. For example, sensors providing tracking data may comprise any two or more of the following: IR (Infrared), optical, LIDAR (Light Detection and Ranging), radar, secondary surveillance (independent of TCAS), TCAS, ADS-B (Automatic Dependent Surveillance-Broadcast), aural, Doppler radar or any other sensor now known or later developed for providing tracking data. Moreover, embodiments of the present invention may provide any desired advisory, such as a Traffic Advisory ("TA"), an RA or any other type of advisory now known or later envisioned.

Systems and methods consistent with embodiments of the present invention can be used for, but are not limited to UAV's to provide an automated collision avoidance maneuver that can be executed safely within the ATC environment, i.e., anywhere within restricted or controlled airspace, or also outside of the ATC environment. In the UAV context, for example, an optical system, as described below, may provide the "see-and-avoid" function normally provided by a pilot as a means of determining whether a TCAS RA maneuver can be safely executed.

Systems and methods consistent with embodiments of the present invention may provide a collision avoidance system for a host aircraft comprising a plurality of sensors for providing data about other aircraft that may be employed to determine one or more parameters to calculate future positions of the other aircraft, a processor to determine whether any combinations of the calculated future positions of the other aircraft are correlated or uncorrelated, and a collision avoidance module that uses the correlated or uncorrelated calculated future positions to provide a signal instructing the performance of a collision avoidance maneuver when a collision threat exists between the host aircraft and at least one of the other aircraft.

It is to be understood that the descriptions of this invention herein are exemplary and explanatory only and are not restrictive of the invention as claimed.

DESCRIPTION OF THE EMBODIMENTS

Reference will now be made in detail to the exemplary embodiments of the present invention, examples of which are illustrated in the accompanying drawings.

Embodiments of the present invention provide systems and methods that employ multiple sensors to provide collision avoidance advisories, such as RAs. One embodiment of the present invention provides means to use TCAS tracking data and optical tracking data to provide an automated resolution advisory. The TCAS tracking data may be determined to be correlated or uncorrelated to the optical tracking data in order to determine what resolution advisory to provide, if any. TCAS tracking data and optical tracking data may be considered to be "correlated" when it is determined that they are both tracking the same object (e.g., another aircraft) and may be considered to be "uncorrelated" when it is determined that they are not both tracking the same object.

Figure 1:
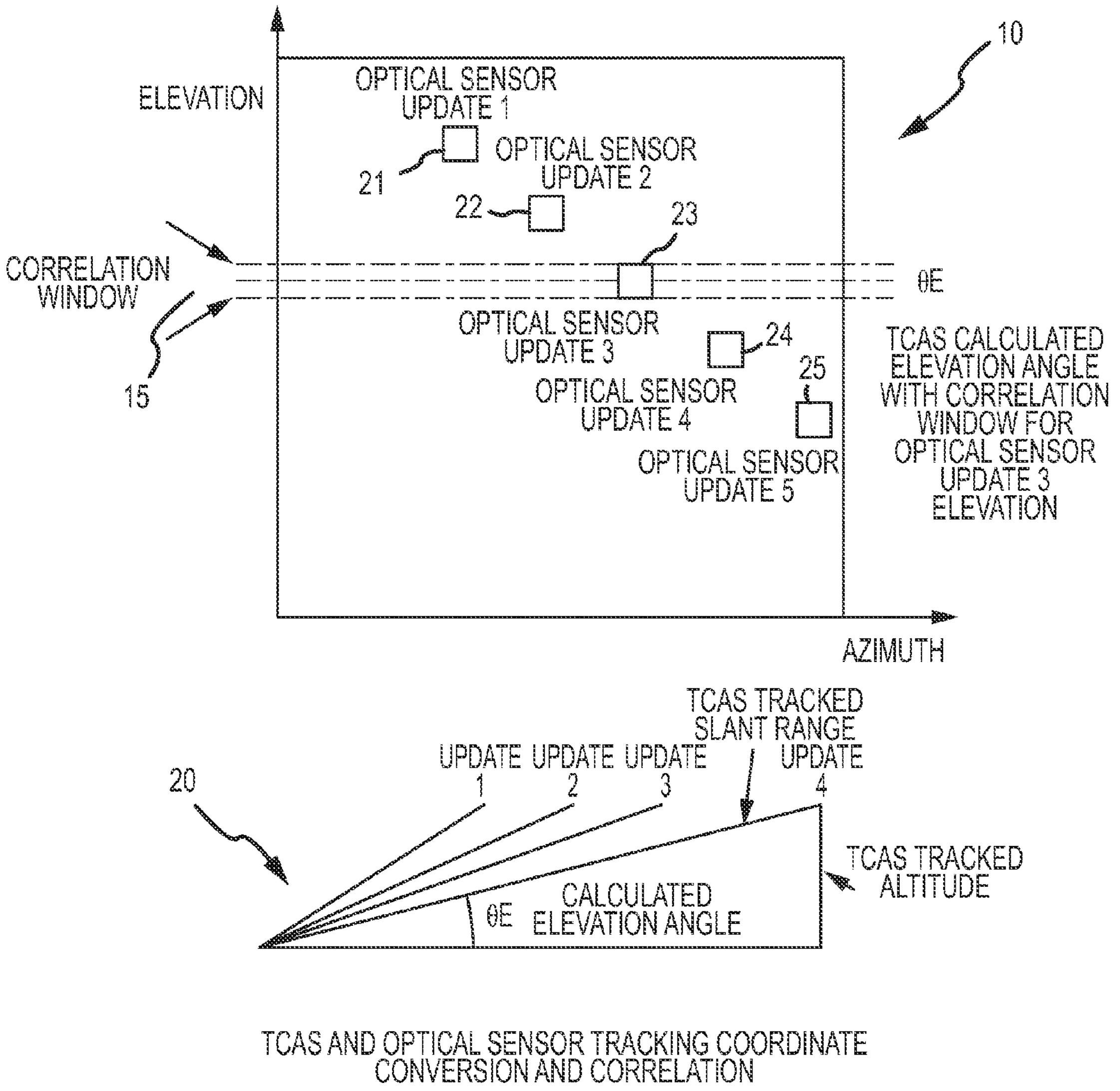
FIG. 1 shows a graphical representation of TCAS and optical sensor tracking coordinate conversion and correlation.

FIG. 1 shows an example of how optical sensor data may be presented in a Cartesian coordinate system, as depicted by graph 10 (elevation—azimuth), without any displayed range measurement. Graph 20 shows how TCAS range and TCAS altitude can be used to calculate an elevation angle (θe) that can be used to correlate with the current optical elevation angle or to predict the next elevation angle of a target. Those skilled in the art know that the TCAS range may be determined by measuring the time between a TCAS interrogation and a reply to that interrogation, the range being proportional to the measured time difference. Similarly, those skilled in the art know that TCAS altitude may be determined based on the altitude for an intruding aircraft that is reported by the intruding aircraft in its reply to a TCAS interrogation. Own aircraft navigation input stabilization is not shown for simplification, but can be added so that tracking can accurately occur for various aircraft pitch angles (other than 0 degrees) during turning maneuvers of the UAV or aircraft. Thus, changes in azimuth or pitch angle of own aircraft can be taken into account by using predicted own aircraft position, as well as the tracked aircraft predicted position for each track update to better center predicted track positions within a correlation window.

Referring back to graph 10, the TCAS-calculated elevation angles (θe) are compared with a correlation window 15 to the elevation angles of the optical data (21, 22, 23, 24 and 25) on a correlated scan-by-scan basis. In other words, at time $t_1$ for update 1, the TCAS-calculated elevation angle (θe) is the entering argument for the correlation window 15 to see if there is a correlated contact from the optical data. For example, as shown in graph 10, the TCAS-calculated elevation angle (θe) at time $t_3$ for update 3 places the correlation window 15 such that it intersects with the optical update 23, and as such, the optical update 23 is correlated with the TCAS data track at time $t_3$ for update 3. The size of the window 15 may be based on the accuracy of the range and altitude measurements of the TCAS system. TCAS range accuracy is generally within about 200 ft. and altitude errors are generally within about 300 ft. For example, for an intruder aircraft having a one nautical mile TCAS slant range from and an altitude of 300 feet above own aircraft, the worst case elevation angle (θe) error is approximately $\text{Sin}^{-1}$ 600'/5876'−$\text{Sin}^{-1}$ 300'/6076'=5.86 degrees−2.83 degrees=3.03 degrees. In general, an error limit of approximately +/− 3 degrees is expected and can be used for an initial correlation window for the tracking algorithm. For example, the correlation window 15 may be centered on a TCAS-calculated elevation angle and cover approximately +/− 3 degrees on both sides of the TCAS-calculated elevation angle, or it could be based on the optical position prediction for the next update based on a derived optical elevation rate with a window expanded +/− 3 degrees relative to the predicted optical elevation angle.

Not shown is a technique for changing the position of own aircraft to create a baseline distance from which to triangulate a range estimate for the optical sensor. This range can then be used to also correlate with TCAS range tracks for aircraft within the environment. For example, one method is to fly to a new lateral position in space so that at least one of the initial or final positions is directly in line with the longitudinal axis of own aircraft. This establishes a right triangle with a baseline length equal to the initial position minus the final lateral position. Positions in space could be determined by a GPS position sensor. If the measurements are taken within a relatively short predetermined period of time, e.g., a few seconds, of one another, an approximate range may be determined by triangulation. For example, for a 650 ft. baseline and an azimuth angle change of 3 degrees, the following can be used to approximate range: Range=650 feet/cosine (90 degrees−3 degrees)=12,420 feet (or approximately 2.0 nautical miles).

Thus, any sensor or set of sensors can be used to correlate with TCAS range, altitude, and/or bearing, to determine if an aircraft detected by another sensor or sensors is the same aircraft that TCAS is also tracking. Determining when another sensor track is the same aircraft that TCAS is tracking is known as track correlation.

TCAS uses the detected range and bearing of an intruder, as well as a data-link-reported altitude for the intruder to determine if a TCAS RA is required. These RA's consist of Climb, Descend, Maintain Vertical Rate and other similar vertical rate commands, as prescribed in RTCA DO-185A to prevent collision of own aircraft with other aircraft in proximity to own aircraft. The detailed operation of TCAS is further discussed in *Radio Technical Commission for Aeronautics* (RTCA) DO-185A, "Minimum Operational Performance Standards for Traffic Alert and Collision Avoidance System II (TCAS II) Airborne Equipment," 1997 and *Radio Technical Commission for Aeronautics* (RTCA) DO-185, "Minimum Operational Performance Standards for Traffic Alert and Collision Avoidance System (TCAS) Airborne Equipment," 1983, both of which are incorporated herein by reference in their entirety.

Other sensors can use various logic to determine if a collision between own aircraft and another aircraft is imminent. For instance, in the example shown using an optical sensor, an azimuth rate less than a set threshold can be used to indicate that another aircraft is headed towards own aircraft. This is because an azimuth rate of zero, for example, indicates that an aircraft may be moving towards own aircraft. An exception to this scenario is when an intruder aircraft is maintaining position with respect to own aircraft at a range less than a predetermined amount, such as less than 2 nautical miles. This exception can be tested for by changing own aircraft speed to see if a bearing rate greater than the collision avoidance threshold can be generated. This technique is typically used by ships at sea when radar tracking information is absent. This rate can be used to determine if and, if so, how own aircraft should maneuver to avoid an on-coming aircraft.

Figure 3:
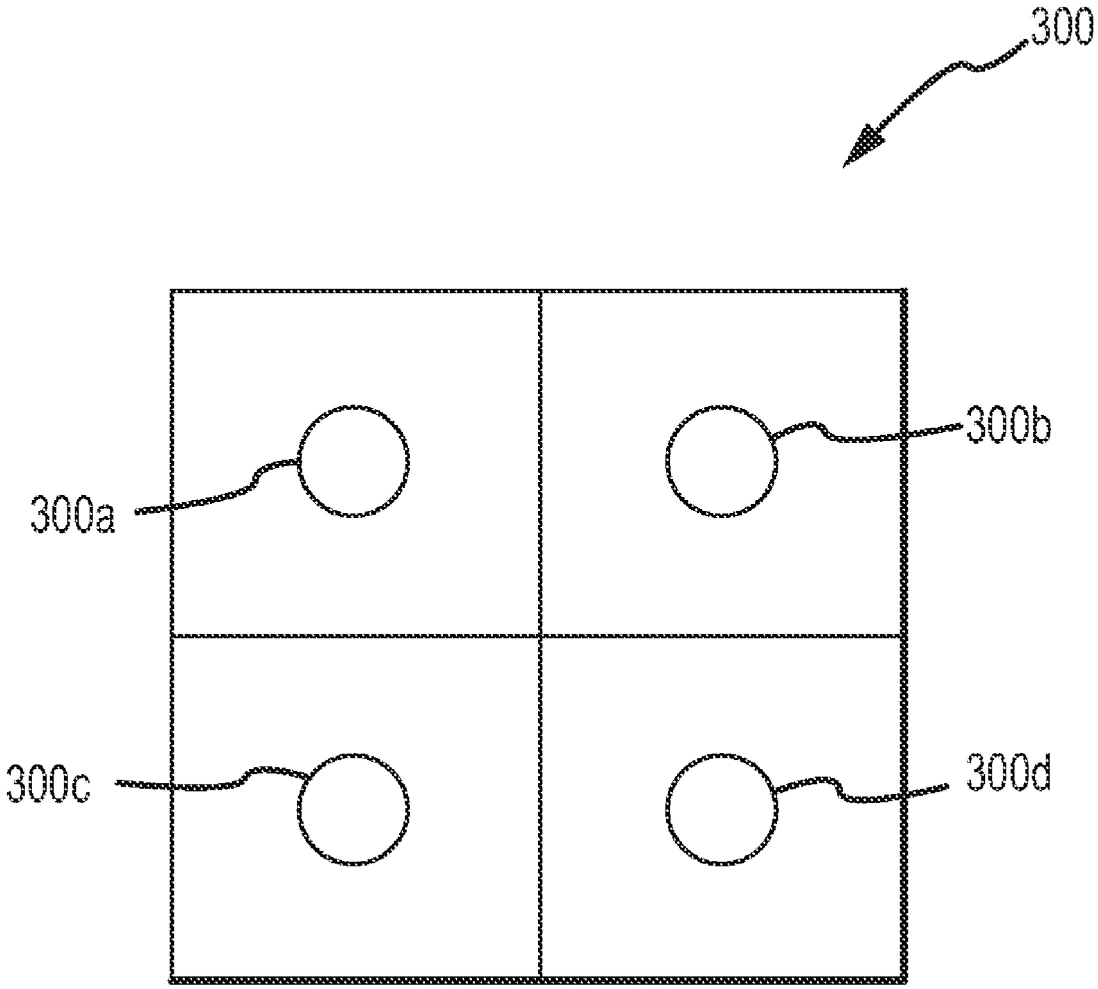
FIG. 3 shows an audio sensor, according to an embodiment of the present invention.

FIG. 3 shows another example sensor that may be employed with systems and methods consistent with embodiments of the present invention. Sensor 300 is an audio sensor that includes an array of audio sensors 300*a*-300*d* acoustically isolated from one another. Those with skill in the art understand that the array may employ any different number and arrangement of audio sensors, if so desired. The location of other aircraft may be determined by sensor 300 by measuring the strength of the sound waves detected by each of the audio sensors 300*a*-300*d* . The stronger the signal produced by the sensor 300*a*, 300*b*, 300*c* or 300*d*, the closer the external aircraft is to the airspace that the respective sensor 300*a*, 300*b*, 300*c* or 300*d* is measuring. Additionally, well known signal processing techniques can be employed with the various sensors 300*a*-300*d* to estimate relative position for an intruding aircraft based on signal strength of the signals from the various sensors 300*a*-300*d*, e.g., two adjacent sensors having the same and maximum signal strength, as compared to the signal strength for the other two sensor, implies that the intruding aircraft is approximately equidistant from the two adjacent sensors having the same and maximum signal strength.

Track correlation between TCAS tracks and other sensor tracks, as well as TCAS RA and other sensor collision prediction information, may then be used by embodiments of the multi-sensor collision avoidance logic of the present invention to determine which maneuver signal to send, if any, to the pilot or autonomous control device.

Figure 2:
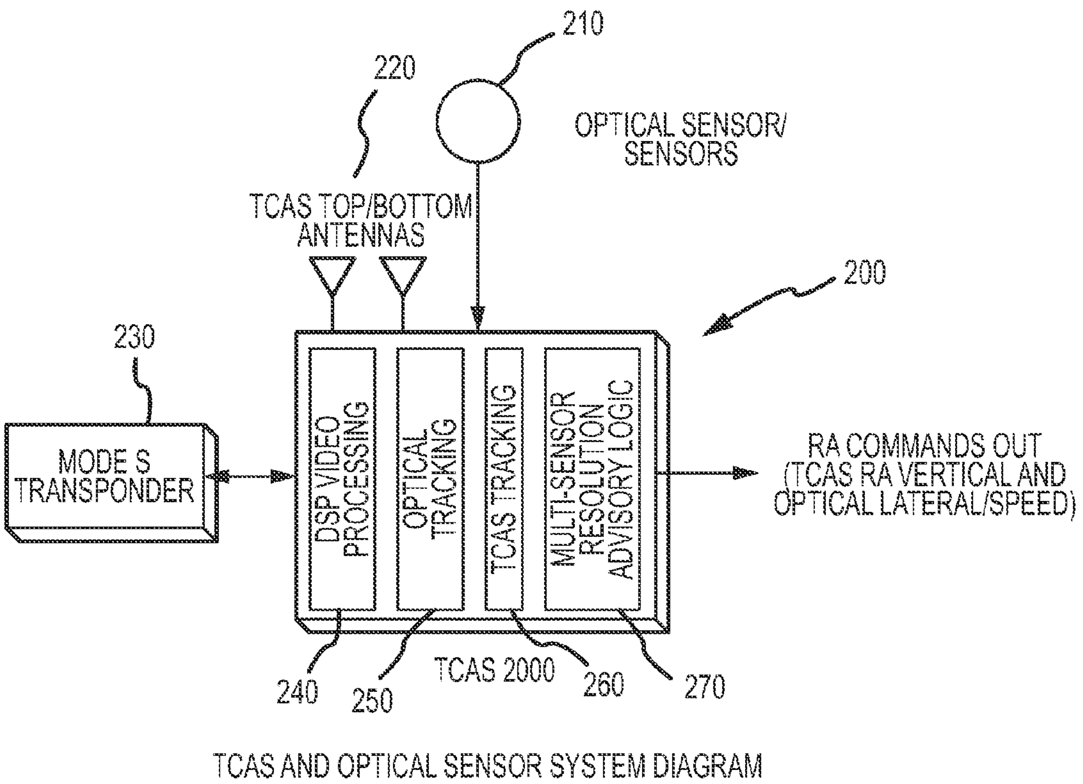
FIG. 2 shows a TCAS and optical sensor system diagram, according to an embodiment of the present invention.

FIG. 2 shows a system diagram of an exemplary system, according to an embodiment of the present invention. A TCAS module 200 is shown with additional processing capability. The TCAS module 200 may comprise any TCAS module presently known, such as an ACSS TCAS 2000 module, or later developed, such as an ACSS TCAS 3000 module. The additional processing includes a DSP video processing unit 240, an optical tracking unit 250, a TCAS tracking unit 260, and multi-sensor resolution advisory logic 270. DSP video processing unit 240 receives signals from one or more optical sensors 210. The processed signals may then be sent to optical tracking unit 250, which may determine the presence of other objects (e.g., other aircraft) in the airspace and the range, altitude, and slant angle to such objects. TCAS tracking unit 260 may comprise any conventional TCAS unit that utilizes TCAS antennas 220 and Mode S transponder 230 to determine possible collisions. Multi-sensor resolution advisory logic 270 then may correlate the TCAS and optical tracks and provide an advisory, such as an RA, according to the embodiments of the present invention, which will be described in greater detail with reference to FIG. 4.

Embodiments of the present invention need not be carried out by modules contained within an existing TCAS, but may be handled by any processor and memory combination adapted to receive the necessary inputs. In the case of the embodiment shown in FIG. 2, inputs would include an optical sensor input and a TCAS tracking input.

Suitable processors may include any circuit that can perform a method that may be recalled from memory and/or performed by logic circuitry. The circuit may include conventional logic circuit(s), controller(s), microprocessor(s), and/or state machine(s) in any combination. Embodiments of the present invention may be implemented in circuitry, firmware, and/or software. Any conventional circuitry may be used (e.g., multiple redundant microprocessors, application specific integrated circuits). For example, the processor may include an Intel PENTIUM® microprocessor or a Motorola POWERPC® microprocessor. The processor may cooperate with any memory to perform methods consistent with embodiments of the present invention, as described herein.

Memory may be used for storing data and program instructions in any suitable manner. Memory may provide volatile and/or nonvolatile storage using any combination of conventional technology (e.g., semiconductors, magnetics, optics) in fixed and/or replaceable packaging. For example, memory may include random access storage for working values and persistent storage for program instructions and configuration data. Programs and data may be received by and stored in the system in any conventional manner.

Figure 4:
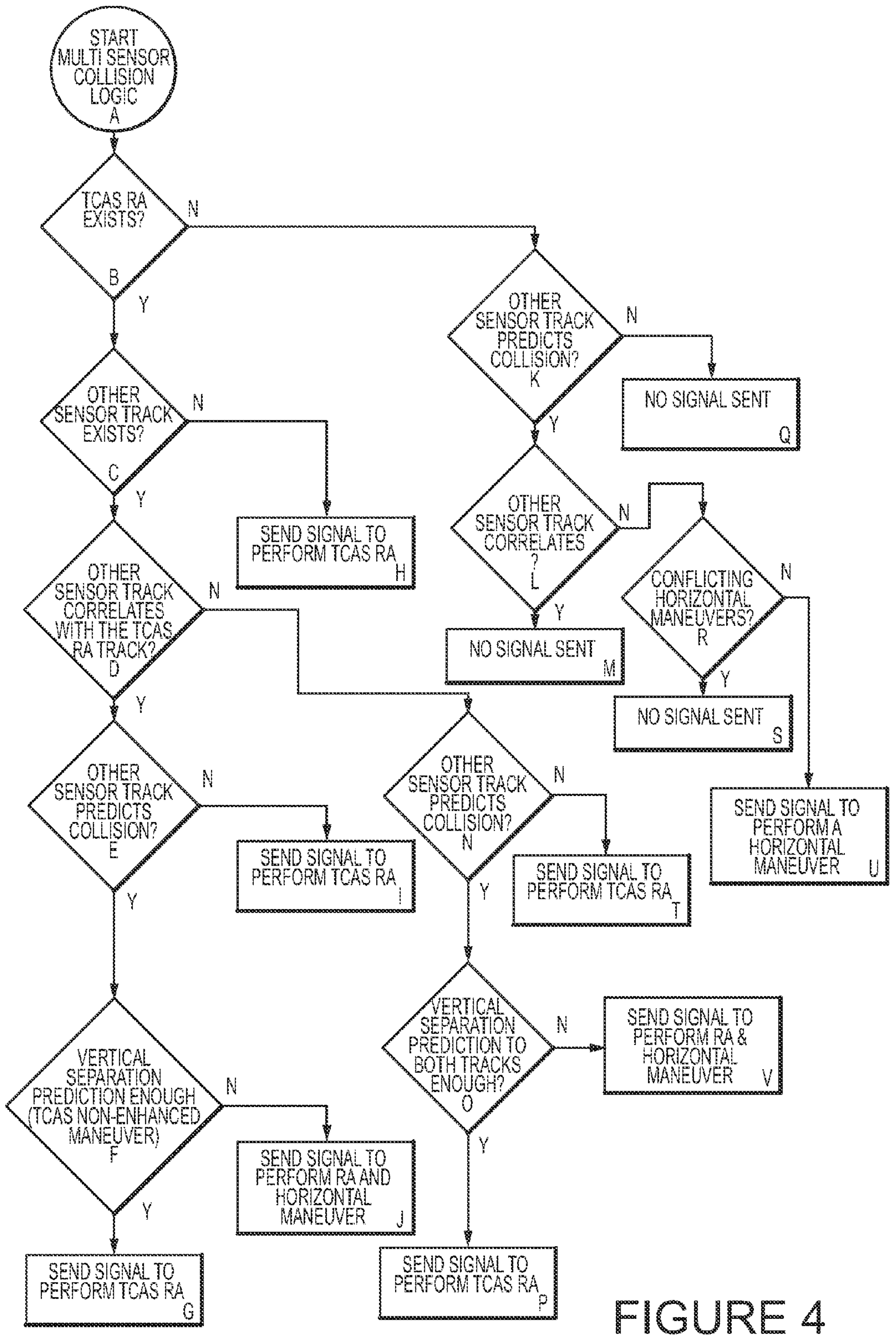
FIG. 4 shows a flowchart of a method for generating an advisory, according to an embodiment of the present invention.

FIG. 4 shows a flowchart depicting multi-sensor collision avoidance logic, which may be employed by embodiments of the present invention. The multi-sensor collision avoidance logic may be employed to determine when to execute a TCAS RA (whether manually or automatically executed), when to execute an other-sensor-based maneuver (whether manually or automatically executed) or a combination of both maneuvers, when additional separation is required.

Step A starts the multi-sensor collision avoidance logic, which may be performed by multi-sensor resolution advisory logic 270, as shown in FIG. 2. It is assumed that the tracking of aircraft by TCAS and by each additional sensor of the system is being accomplished prior to or at the start of the multi-sensor collision avoidance logic. Each aircraft track is then run through this logic to determine which collision avoidance signal, if any, to send to the pilot or autonomous control device (such as an autopilot). When several collision avoidance signals are called for by the logic, then all non-duplicated signals are sent out to the pilot or autonomous control device.

Step B determines if a TCAS RA is called for according to the TCAS collision avoidance logic, as described in RTCA DO-185A. If a TCAS RA is called for, then step C determines if other sensor tracks exist. In the case of the embodiment of FIG. 2, step C would determine if the optical tracking unit 250 had detected any aircraft tracks from the signal received from optical sensor 210 and processed by DSP video processing unit 240. If other sensor tracks exist, then step D determines if any other sensor tracks correlate with the TCAS RA track.

For each track that correlates, step E determines if a potential collision has been determined by another sensor. It is often the case that the other sensors detect a track of another aircraft, but no collision is predicted. If a potential collision has been determined by another sensor, step F looks at the predicted vertical separation, and if it is enough separation then the TCAS RA signal is continuously sent in step G. Vertical separation may be determined based on a exemplary pilot response to a TCAS RA (e.g., a 5 second delay), an assumed vertical rate (e.g., 1500 feet/minute) and a time to closest point of approach (e.g., 20 to 30 seconds) per RTCA DO-185/DO-185A. If a potential collision has not been determined by another sensor in step E, then step I sends a signal to perform a TCAS RA. If a potential collision has been determined by another sensor in step E and step F determines insufficient vertical separation, then the multi-sensor resolution advisory logic 270 commands an enhanced maneuver in step J, such as Increase Climb or Increase Descent, and a horizontal maneuver which are both transmitted to the pilot or autonomous control device.

Returning to step B, if a TCAS RA does not exist, then step K determines if any other sensor track(s) are predicting a collision. If the other sensor track(s) predict a collision, then step L checks to see if a TCAS track correlates with the other sensor track(s). If the other sensor track(s) do not predict a collision, then in step Q no signal is sent for any corrective action. If a correlation between a TCAS track and the other sensor track(s) exists, then step M does not send a signal for any maneuver to the pilot or autonomous control device (this is because TCAS “sees” the target and has determined that there is enough vertical clearance to prevent a collision).

If there is no correlation between a TCAS track and the other sensor track(s), then a further check in step R is done to see if there is more than one other sensor track prediction for a collision, and if the required horizontal maneuvers are in conflict with one another, i.e. one track requires a turn right maneuver and the other track requires a turn left maneuver, then step S does not send a signal for any maneuver to the pilot or autonomous control device (this is because there is no clear choice as to which of the two conflicting horizontal maneuvers to pick, so the only choice is to continue flying on the current flight path, since TCAS has also not provided a vertical sense maneuver). If the horizontal maneuvers are not conflicting with one another, then in step U a horizontal maneuver signal is sent to the pilot or autonomous control device.

Step H is used for the case where step C has determined that there are no other sensor tracks in proximity and that the TCAS RA signal of step H can be sent.

Step N is used when step D does not detect that another sensor track correlates to a TCAS RA track. In step N, the system determines whether other sensor track(s) predict a collision, and if so, in step O, the system determines whether the vertical separation prediction to both tracks is beyond a "safe threshold" (e.g., 400 ft.). Then, if the vertical separation prediction to both tracks is sufficient, a TCAS vertical RA can be safely performed, so step P sends a TCAS RA signal to the pilot or autonomous control device. If step O does not determine that there is enough vertical separation to both tracks, then step V sends a TCAS RA and horizontal maneuver to the pilot or autonomous control device. If step N does not determine that another sensor predicts a collision, then step T sends a TCAS RA signal to the pilot or autonomous control device.

Figure 5:
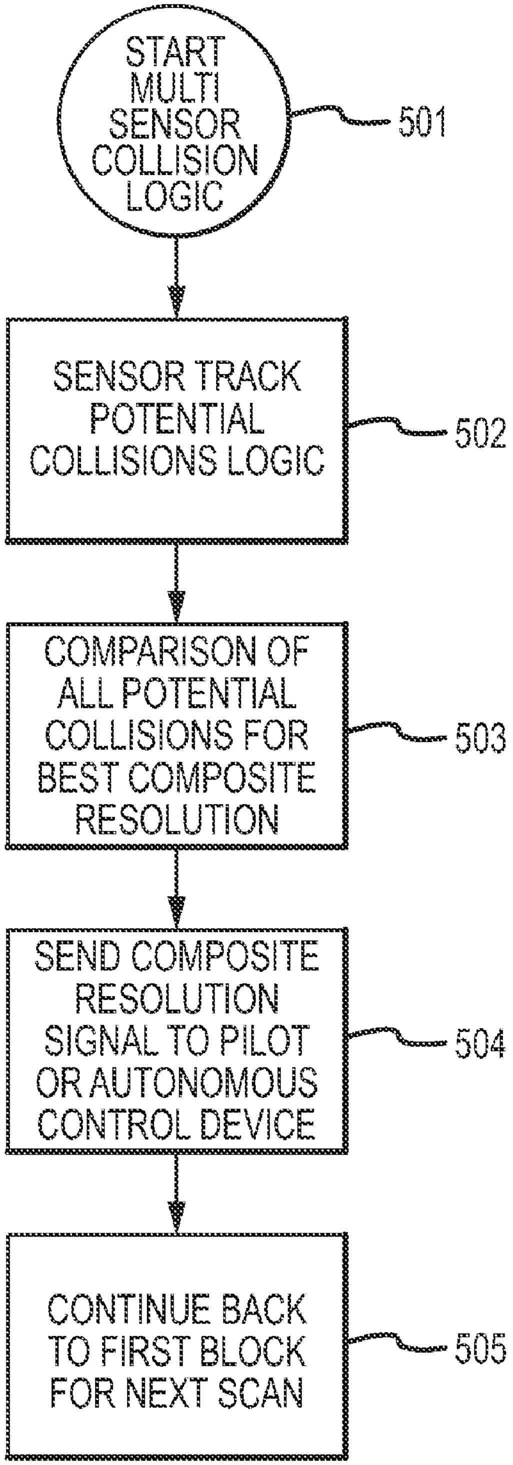
FIG. 5 shows a flowchart of a method for generating an advisory, according to an embodiment of the present invention.

FIG. 5 shows the more general case where more than one sensor is utilized to determine if collision threats exist with other vehicles. These sensors may comprise any two or more of the following: IR (Infrared), optical, LIDAR (Light Detection and Ranging), radar, secondary surveillance (independent of TCAS), TCAS, ADS-B (Automatic Dependent Surveillance-Broadcast), aural, Doppler radar or any other sensor now known or later developed for providing tracking data. Such tracking data may comprise any data for determining position, velocity, bearing rate, azimuth rate, elevation angle, absolute or relative altitude, relative bearing or any other parameter that can be used to determine if a collision between two vehicles is projected.

Step 501 starts the multi-sensor collision avoidance logic of FIG. 5, which is more general than the exemplary multi-sensor collision avoidance logic of FIG. 4. Like the multi-sensor collision avoidance logic of FIG. 4, that shown in FIG. 5 also assumes that tracking of aircraft by each sensor is being accomplished. Each aircraft track is evaluated according to steps 502-505 to determine which collision avoidance signal, if any, to send to the pilot or autonomous control device (such as an autopilot). When several collision avoidance signals are called for by the logic, then all non-duplicated signals are sent to the pilot or autonomous control device.

Step 502 determines when a potential collision with own vehicle exists. This can be a calculation based on range rate and altitude rate convergence toward own vehicle, as is the case for TCAS. Alternatively, the determination can be based on a bearing rate and calculated altitude and altitude rate closure with respect to own aircraft, or any other means of determining that two vehicles are converging on the same point in space (with some degree of tolerance such as in ATC airspace where a 500 ft. vertical clearance and 1000 ft. horizontal clearance is allowed in the worst case) at the same time such as to potentially cause a collision.

Step 503 compares each collision threat to determine the best composite resolution of the collision threats that may exist at the same time that are not conflicting with one another, or in the case of only one collision threat, determines that another sensor of greater accuracy, reliability or other measure of priority has determined that the other vehicle is not a threat (and thus inhibiting any resolution selection), or the sensor determining the potential collision has sufficient accuracy, reliability or other measure of priority to cause a non-composite maneuver to be selected.

Step 504 is the logic interface that formats the collision resolution signal to send to the autonomous control device or pilot.

Step 505 is the logic that causes a repetitive evaluation of all sensor tracks through steps 502-504 until the entire number of tracks have been evaluated for each scan, where a scan is a time interval that can occur randomly, uniformly, jittered, triggered or any other method of causing the complete execution of the multi-sensor collision avoidance logic for every sensor track generated within the system.

FIGS. 6 to 13 are included for reference and show exemplary TCAS multi-sensor collision avoidance logic for various types of aircraft encounters for up to two other traffic aircraft at a time. These charts are intended to illustrate the types of encounters expected in near proximity to own aircraft within the ATC airport environment that might be expected to create potential collision hazards. These charts are not all inclusive of every possible encounter, but can be used as examples to examine how more than one sensor and more than one resolution of potential collisions can occur.

Figure 6:
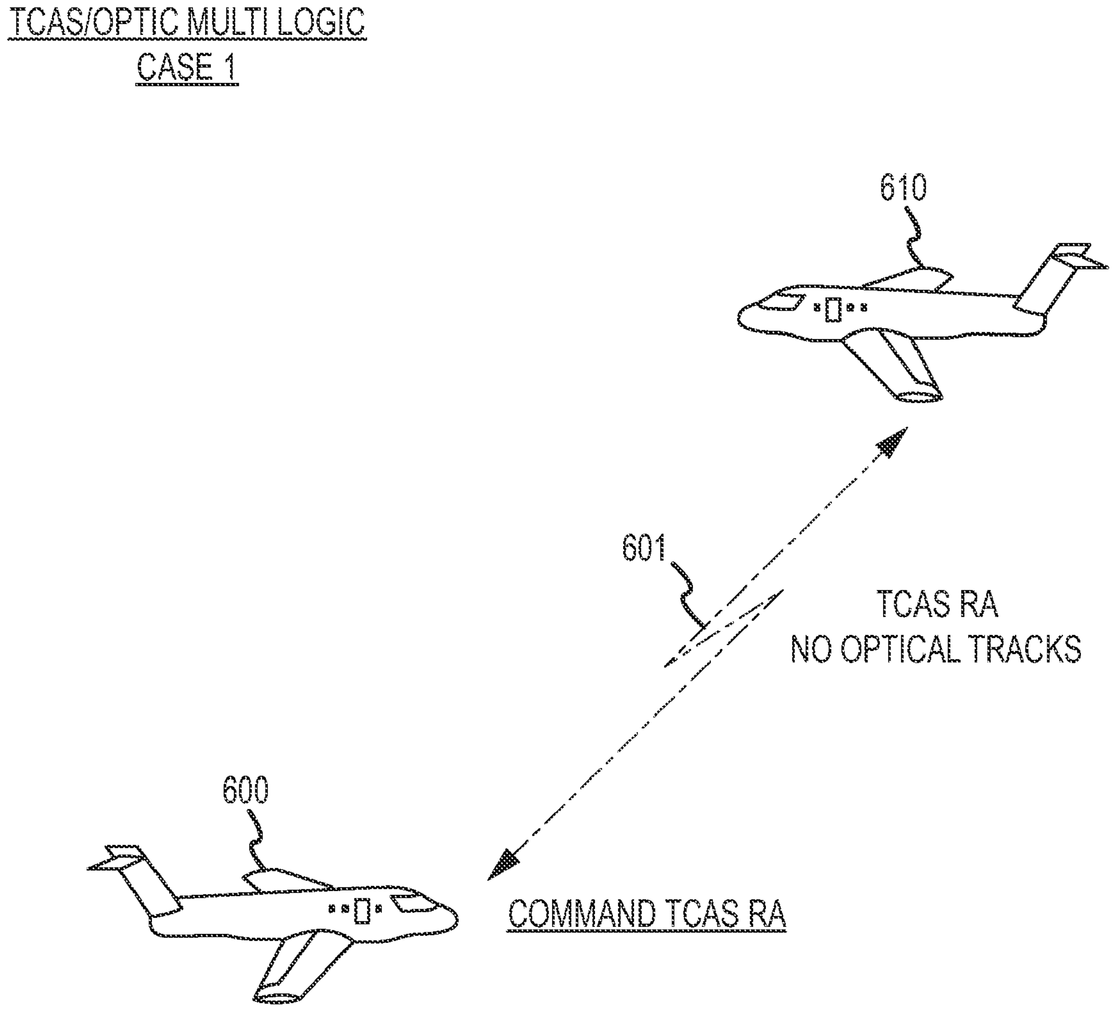
FIG. 6 shows a TCAS only scenario, according to an embodiment of the present invention.

In FIG. 6, own aircraft 600 has received a TCAS RA 601 concerning aircraft 610. In this situation, no optical tracks have been detected, and as such, there are no optical correlations. Accordingly, own aircraft would receive the TCAS RA command.

Figure 7:
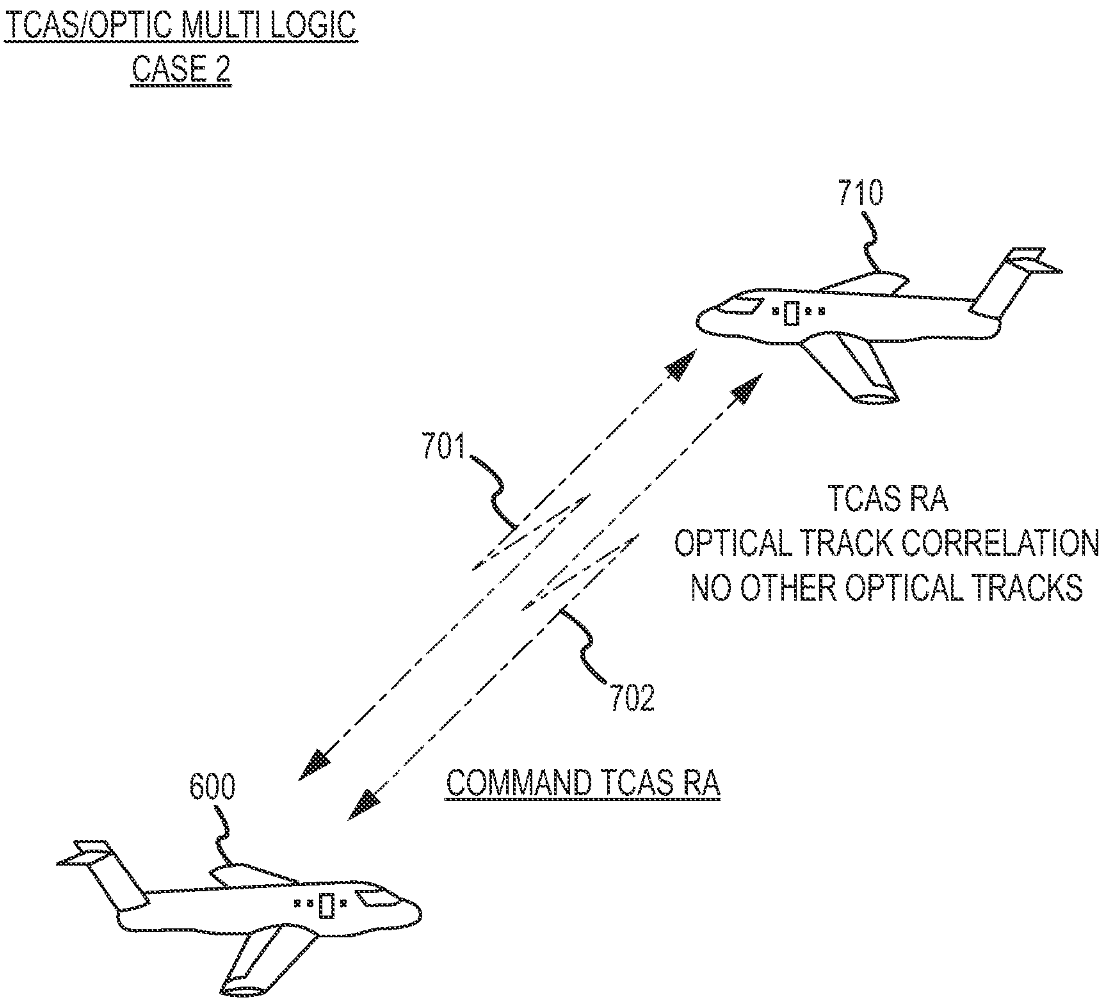
FIG. 7 shows a correlated TCAS and optical scenario, according to an embodiment of the present invention.

In FIG. 7, own aircraft 600 has received a TCAS RA 701 that has been correlated with an optical track 702 concerning aircraft 710. There are no other optical tracks detected. In this case, own aircraft would receive the TCAS RA command. When the system correlates tracks from multiple sources, such as a TCAS and an optical sensor, the display of such tracks may take a unique form indicating that the displayed track is correlated from multiple sensors, as opposed to a track from a single sensor.

Figure 8:
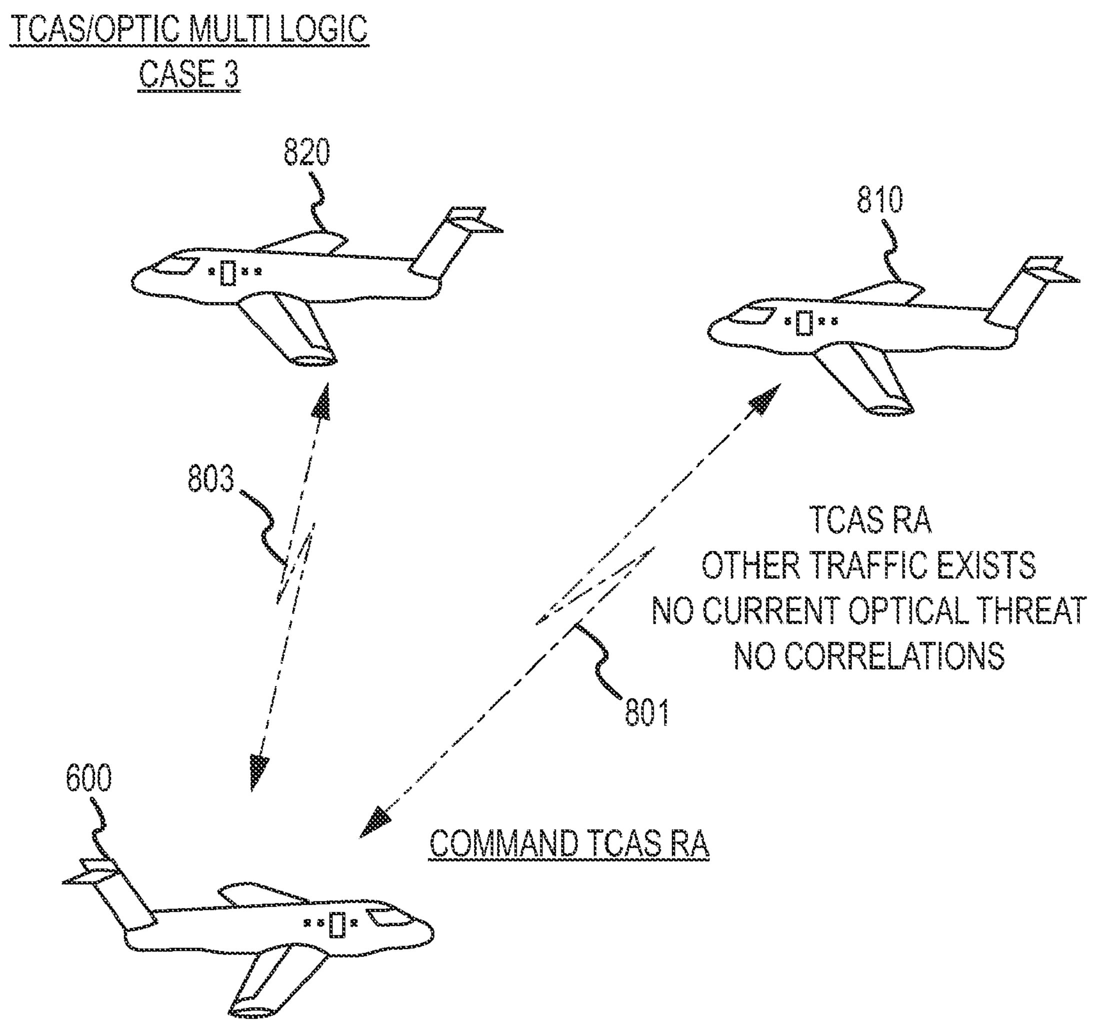
FIG. 8 shows an uncorrelated TCAS and optical scenario, according to an embodiment of the present invention.

In FIG. 8, own aircraft 600 detects two other aircraft 810 and 820. An uncorrelated TCAS RA 801 is received with regard to aircraft 810. Another aircraft 820 is detected through an uncorrelated optical track 803, but no collision with regard to aircraft 820 is detected or predicted for a TCAS RA maneuver. In this case, own aircraft would receive the TCAS RA command.

Figure 9:
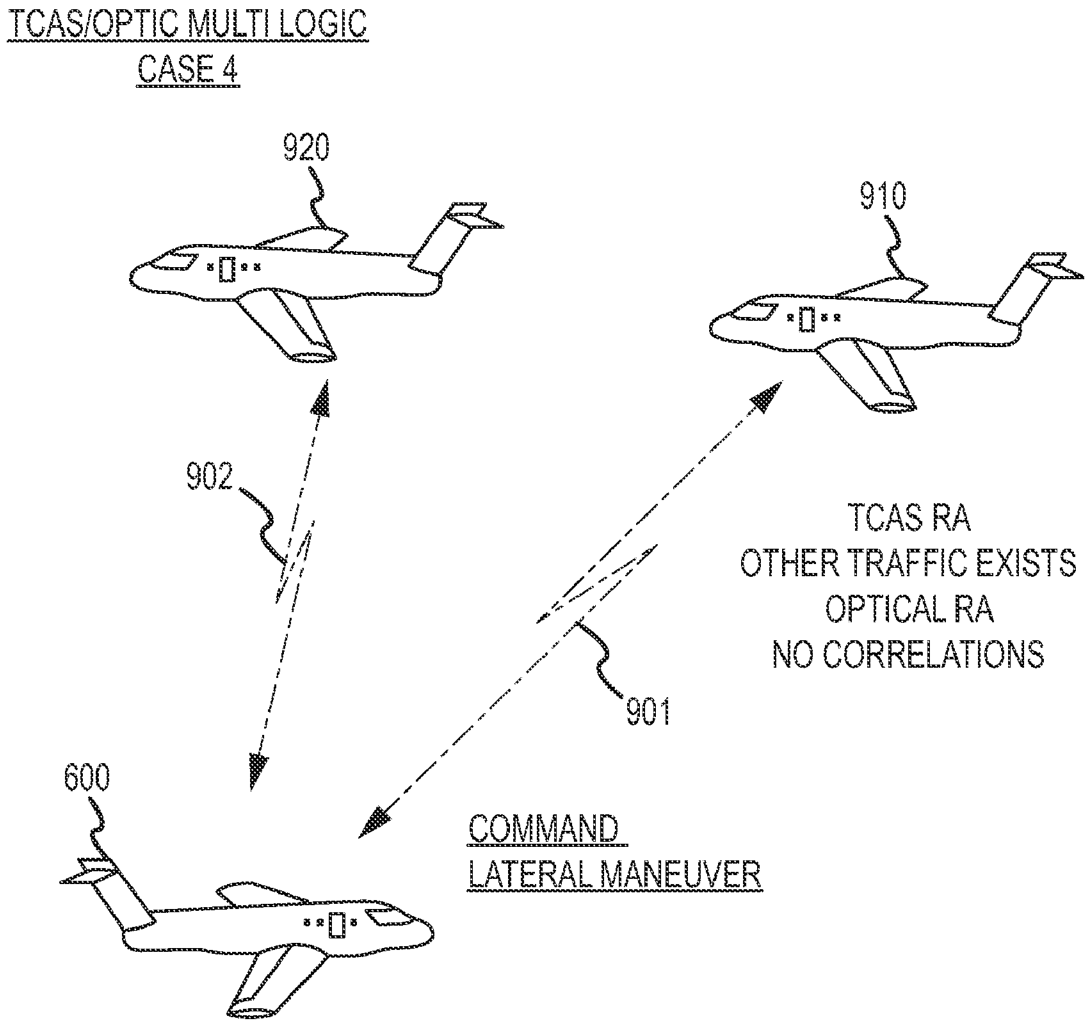
FIG. 9 shows another uncorrelated TCAS and optical scenario, according to an embodiment of the present invention.

In FIG. 9, own aircraft 600 detects two other aircraft 910 and 920. An uncorrelated optical RA 901 is received with regard to aircraft 910. Another aircraft 920 is detected through uncorrelated optical track 902, but no collision with regard to aircraft 920 is detected or predicted for an optical RA. In this case, own aircraft would receive the lateral maneuver command.

Figure 10:
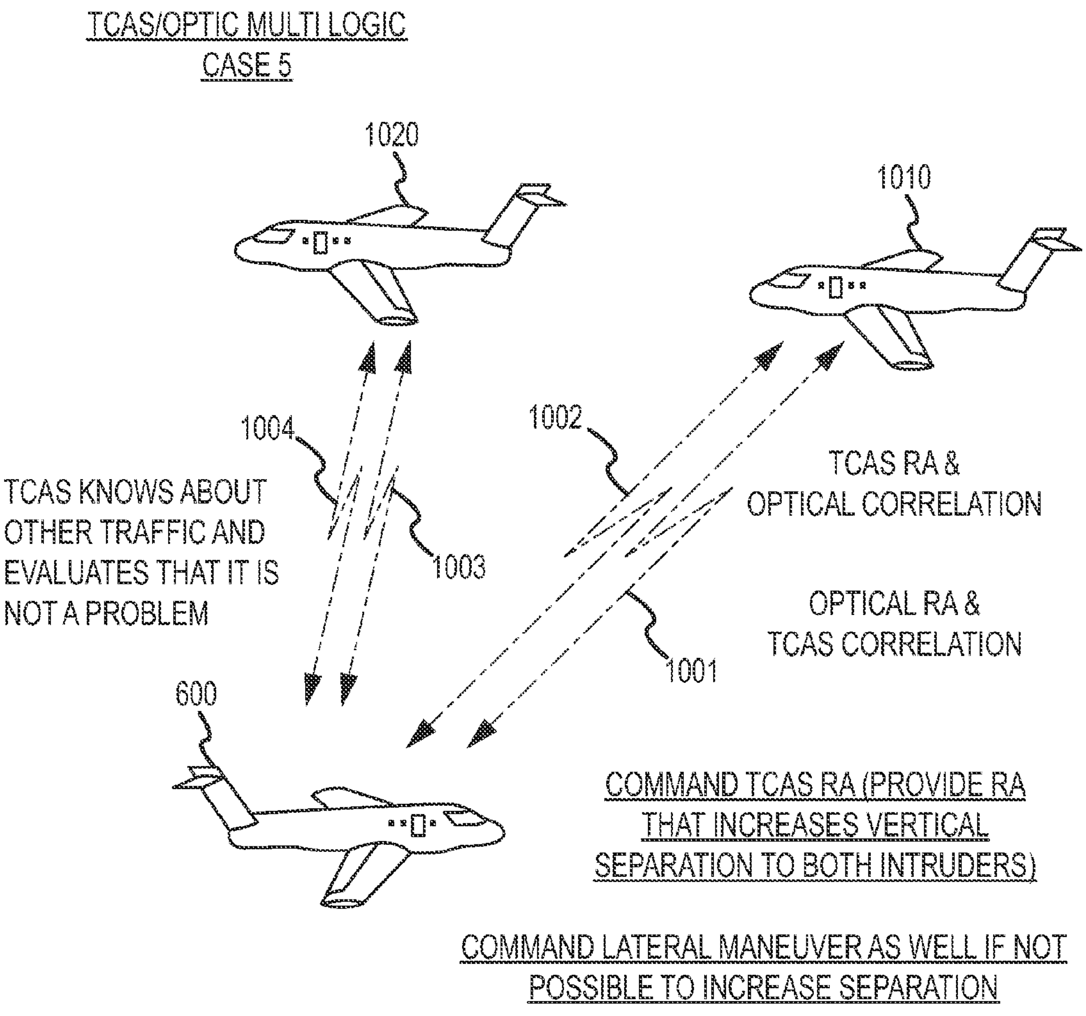
FIG. 10 shows another correlated TCAS and optical scenario, according to an embodiment of the present invention.

In FIG. 10, own aircraft 600 detects two other aircraft 1010 and 1020. A TCAS RA 1001, which is correlated with optical track 1002, is received with regard to aircraft 1010. In addition, an optical RA 1004, which is correlated with TCAS track 1003, is received with regard to aircraft 1020. In this case, own aircraft would receive a TCAS RA command that increases the vertical separation to both aircraft. If this is not possible, a lateral maneuver command would also be received.

Figure 11:
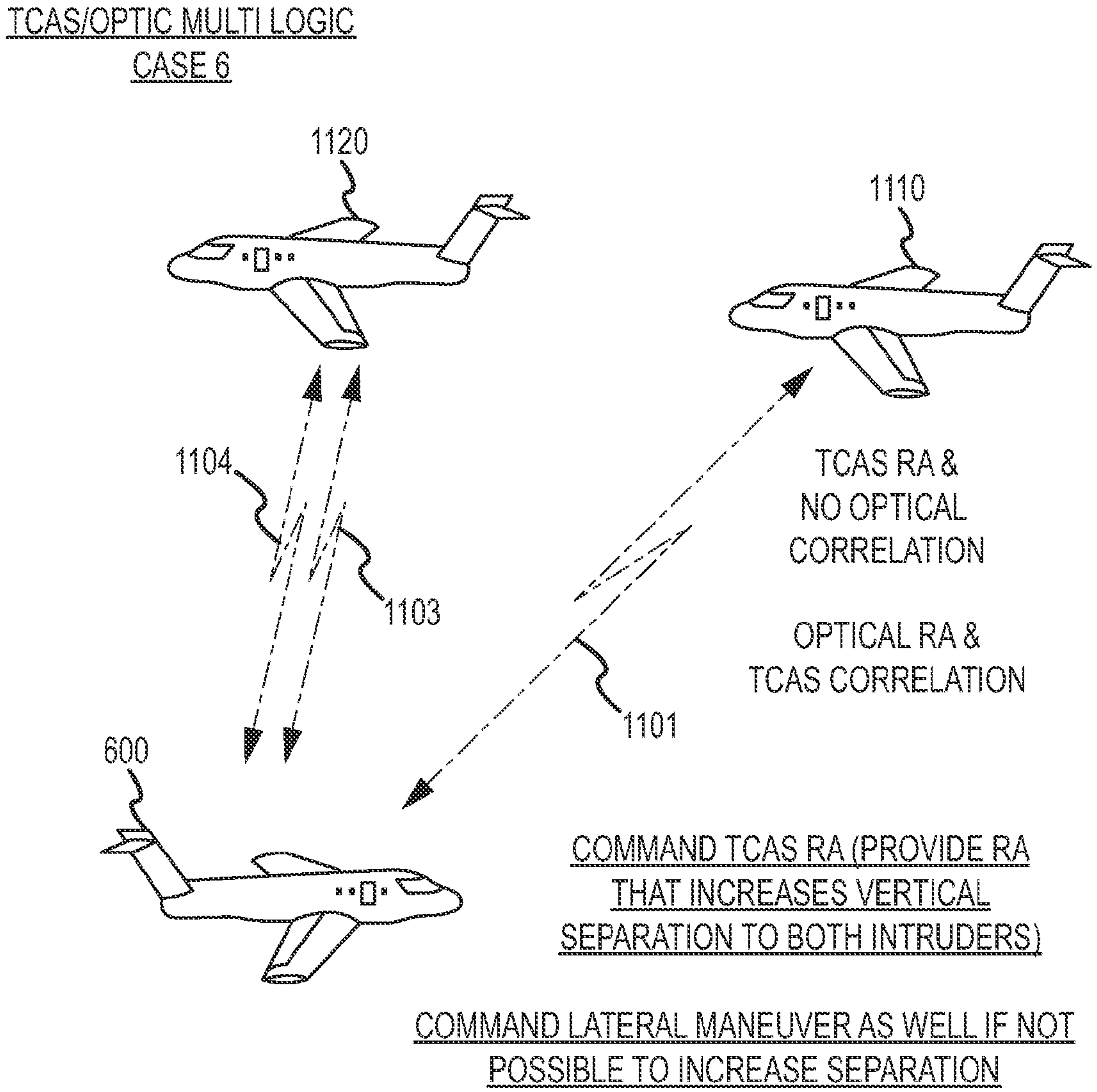
FIG. 11 shows a mixed correlation TCAS and optical scenario, according to an embodiment of the present invention.

In FIG. 11, own aircraft 600 detects two other aircraft 1110 and 1120. An uncorrelated TCAS RA 1101 is received with regard to aircraft 1110. In addition, an optical RA 1104, which is correlated with TCAS track 1103, is received with regard to aircraft 1120. In this case, own aircraft would receive a TCAS RA command that increases the vertical separation to both aircraft. If this is not possible, a lateral maneuver command would also be received.

Figure 12:
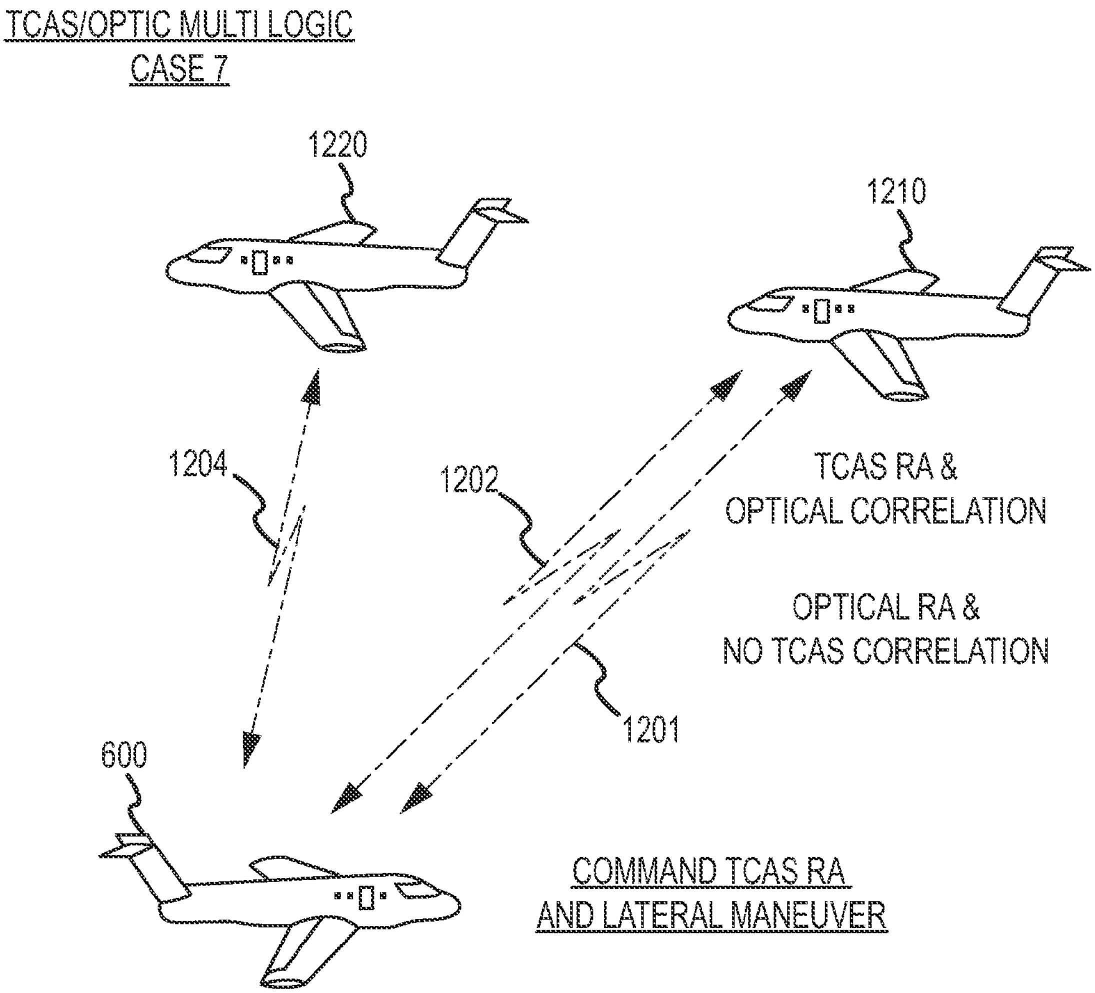
FIG. 12 shows another mixed correlation TCAS and optical scenario, according to an embodiment of the present invention.

In FIG. 12, own aircraft 600 detects two other aircraft 1210 and 1220. A TCAS RA 1201, which is correlated with optical track 1202, is received with regard to aircraft 1210. An uncorrelated optical RA 1204 is received with regard to aircraft 1220. In this case, own aircraft 600 would receive both a TCAS RA command and a lateral maneuver command.

Figure 13:
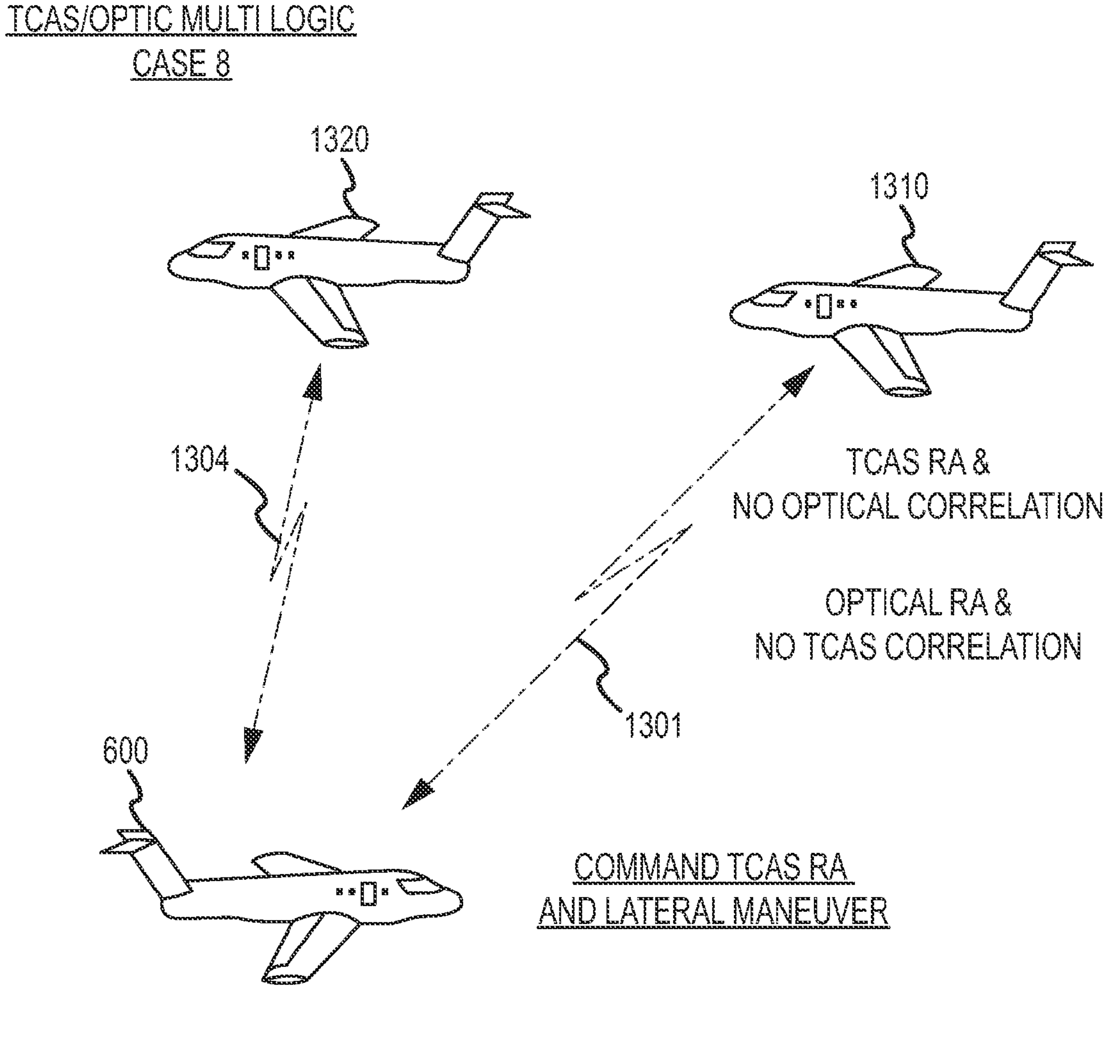
FIG. 13 show another uncorrelated TCAS and optical scenario, according to an embodiment of the present invention.

In FIG. 13, own aircraft 600 detects two other aircraft 1310 and 1320. An uncorrelated TCAS RA 1301 is received with regard to aircraft 1310. In addition, an uncorrelated optical RA 1304 is received with regard to aircraft 1320. In this case, own aircraft 600 would receive both a TCAS RA command and a lateral maneuver command.

Other embodiments of the invention will be apparent to those skilled in the art from consideration of the specification and embodiments disclosed herein. Thus, the specification and examples are exemplary only, with the true scope and spirit of the invention set forth in the following claims and legal equivalents thereof.

What is claimed is:

1. A collision avoidance system for a host aircraft, comprising:

a plurality of sensors for providing data about other aircraft that may be employed to determine one or more parameters to calculate future positions of the other aircraft;

a processor to determine whether any combinations of the calculated future positions of the other aircraft are correlated or uncorrelated; and a collision avoidance module that uses the correlated or uncorrelated calculated future positions to provide a signal instructing the performance of a collision avoidance maneuver when a collision threat exists between the host aircraft and at least one of the other aircraft;

wherein the plurality of sensors includes a TCAS and an optical sensor and wherein the collision avoidance maneuver is a TCAS resolution advisory when (a) one or more future positions calculated by a processor for the TCAS predicts a collision and (b) no other future positions have been determined based on data from the optical sensor.

2. The collision avoidance system of claim 1 wherein the plurality of sensors includes an audio sensor.

3. The collision avoidance system of claim 1 wherein the collision avoidance maneuver is a TCAS resolution advisory when (a) one or more future positions calculated by a processor for the TCAS predicts a collision and (b) one or more future positions have been determined based on data from the optical sensor but the one or more future positions that have been determined based on data from the optical sensor do not correlate to the one or more future positions calculated by the processor for the TCAS and do not predict a collision.

4. The collision avoidance system of claim 1 wherein the collision avoidance maneuver is a TCAS resolution advisory when (a) one or more future positions calculated by a processor for the TCAS predicts a collision and (b) one or more future positions have been determined based on data from the optical sensor that correlate to the one or more future positions calculated by the processor for the TCAS and predict a collision, while a predefined minimum vertical separation is determined to exist.

5. The collision avoidance system of claim 1 wherein the collision avoidance maneuver is a TCAS resolution advisory and a horizontal maneuver when (a) one or more future positions calculated by a processor for the TCAS predicts a collision and (b) one or more future positions have been determined based on data from the optical sensor that correlate to the one or more future positions calculated by the processor for the TCAS and predict a collision, while a predefined minimum vertical separation is determined not to exist.

6. The collision avoidance system of claim 1 wherein the collision avoidance maneuver is a TCAS resolution advisory when (a) one or more future positions calculated by a processor for the TCAS predicts a collision and (b) one or more future positions have been determined based on data from the optical sensor but do not correlate to the one or more future positions calculated by the processor for the TCAS and do predict a collision, while a predefined minimum vertical separation is determined to exist.

7. The collision avoidance system of claim 1 wherein the collision avoidance maneuver is a TCAS resolution advisory and a horizontal maneuver when (a) one or more future positions calculated by a processor for the TCAS predicts a collision and (b) one or more future positions have been determined based on data from the optical sensor but do not correlate to the one or more future positions calculated by the processor for the TCAS and do predict a collision, while a predefined minimum vertical separation is determined not to exist.

8. The collision avoidance system of claim 1 wherein the collision avoidance maneuver is a horizontal maneuver when (a) one or more future positions calculated by a processor for the TCAS do not predict a collision and (b) one or more future positions have been determined based on data from the optical sensor and do predict a collision.

9. The collision avoidance system of claim 1 wherein the signal instructs a pilot to perform the collision avoidance maneuver.

10. The collision avoidance system of claim 1 wherein the signal prompts automatic performance of the collision avoidance maneuver.

11. A method of operating a collision avoidance system for a host aircraft, comprising:

receiving from a plurality of sensors data about other aircraft;

determining from the received data one or more parameters to calculate future positions of the other aircraft;

determining with a processor whether any combinations of the calculated future positions of the other aircraft are correlated or uncorrelated; and providing with a collision avoidance module that uses the correlated or uncorrelated calculated future positions a signal instructing the performance of a collision avoidance maneuver when a collision threat exists between the host aircraft and at least one of the other aircraft;

wherein the plurality of sensors includes a TCAS and an optical sensor and wherein the collision avoidance maneuver is a TCAS resolution advisory when (a) one or more future positions calculated by a processor for the TCAS predicts a collision and (b) no other future positions have been determined based on data from the optical sensor.

12. The method of claim 11 wherein the plurality of sensors includes an audio sensor.

13. The method of claim 11 wherein the signal instructs a pilot to perform the collision avoidance maneuver.

14. The method of claim 11 wherein the signal prompts automatic performance of the collision avoidance maneuver.

* * * * *